(12) United States Patent
Dong

(10) Patent No.: US 12,542,107 B2
(45) Date of Patent: Feb. 3, 2026

(54) SCAN CIRCUIT AND DISPLAY APPARATUS

(71) Applicants: Chengdu BOE Optoelectronics Technology Co., Ltd., Sichuan (CN); BOE Technology Group Co., Ltd., Beijing (CN)

(72) Inventor: Hang Dong, Beijing (CN)

(73) Assignees: Chengdu BOE Optoelectronics Technology Co., Ltd., Sichuan (CN); BOE Technology Group Co., Ltd., Beijing (CN)

(*) Notice: Subject to any disclaimer, the term of this patent is extended or adjusted under 35 U.S.C. 154(b) by 207 days.

(21) Appl. No.: 18/042,290

(22) PCT Filed: Apr. 28, 2022

(86) PCT No.: PCT/CN2022/089800
§ 371 (c)(1),
(2) Date: Feb. 20, 2023

(87) PCT Pub. No.: WO2023/206210
PCT Pub. Date: Nov. 2, 2023

(65) Prior Publication Data
US 2024/0274087 A1    Aug. 15, 2024

(51) Int. Cl.
G09G 3/3266    (2016.01)

(52) U.S. Cl.
CPC ... *G09G 3/3266* (2013.01); *G09G 2300/0426* (2013.01)

(58) Field of Classification Search
CPC .... G06F 3/0412; G06F 3/04166; G06F 3/044; G06F 3/04164; G06F 3/0446; G06F 3/047; G06F 3/147
See application file for complete search history.

(56) References Cited

U.S. PATENT DOCUMENTS

2013/0342584 A1* 12/2013 Song .................... G09G 3/3266
345/690
2017/0294458 A1    10/2017 Umezaki
(Continued)

FOREIGN PATENT DOCUMENTS

| CN | 1440013 A | 9/2003 |
|---|---|---|
| CN | 1601594 A | 3/2005 |

(Continued)

OTHER PUBLICATIONS

International Search Report & Written Opinion mailed Dec. 6, 2022, regarding PCT/CN2022/089800.

Primary Examiner — William Boddie
Assistant Examiner — Alecia D English
(74) Attorney, Agent, or Firm — Intellectual Valley Law, P.C.

(57) ABSTRACT

A scan circuit having a plurality of stages is provided. A respective scan unit of the scan circuit in the respective stage of the plurality of stages includes an input subcircuit, an output subcircuit, a first processing subcircuit, a second processing subcircuit, and a third processing subcircuit. The respective scan unit includes a first capacitor in the second processing subcircuit; a third capacitor in the third processing subcircuit; an eighth transistor in the first processing subcircuit; and a ninth transistor and a tenth transistor in the output subcircuit. Along the first direction, the eighth transistor is on a side of the ninth transistor and the tenth transistor away from the first capacitor, the third capacitor, and other transistors of the respective scan unit.

19 Claims, 13 Drawing Sheets

(56) References Cited

U.S. PATENT DOCUMENTS

| | | | |
|---|---|---|---|
| 2019/0019462 A1* | 1/2019 | Kim | G09G 3/3266 |
| 2021/0304659 A1 | 9/2021 | Qing et al. | |
| 2021/0366358 A1* | 11/2021 | Li | G11C 19/28 |
| 2022/0068212 A1 | 3/2022 | Yao et al. | |
| 2022/0189405 A1 | 6/2022 | Bai et al. | |
| 2022/0199029 A1 | 6/2022 | Xiao et al. | |
| 2022/0310006 A1 | 9/2022 | Yu et al. | |
| 2022/0343856 A1 | 10/2022 | Yu et al. | |
| 2023/0042966 A1 | 2/2023 | Huangfu et al. | |
| 2024/0274068 A1* | 8/2024 | Kang | G09G 3/32 |

FOREIGN PATENT DOCUMENTS

| | | |
|---|---|---|
| CN | 107945742 A | 4/2018 |
| CN | 111627387 A | 9/2020 |
| CN | 111816691 A | 10/2020 |
| CN | 112838109 A | 5/2021 |
| CN | 113205773 A | 8/2021 |
| CN | 113228146 A | 8/2021 |
| CN | 113241040 A | 8/2021 |
| CN | 113257194 A | 8/2021 |
| CN | 113785353 A | 12/2021 |
| CN | 113823640 A | 12/2021 |
| CN | 215771147 U | 2/2022 |
| CN | 114175166 A | 3/2022 |
| KR | 20080006742 A | 1/2008 |
| WO | 2021203423 A1 | 10/2021 |
| WO | 2021243638 A1 | 12/2021 |
| WO | 2021253392 A1 | 12/2021 |

\* cited by examiner

SCAN CIRCUIT AND DISPLAY APPARATUS

CROSS-REFERENCE TO RELATED APPLICATION

This application is a national stage application under 35 U.S.C. § 371 of International Application No. PCT/CN2022/089800, filed Apr. 28, 2022, the contents of which are incorporated by reference in the entirety.

TECHNICAL FIELD

The present invention relates to display technology, more particularly, to a scan circuit and a display apparatus.

BACKGROUND

Image display apparatuses include a driver for controlling image display in each of a plurality of pixels. The driver is a transistor-based circuit including a gate driving circuit and a data driving circuit. The gate driving circuit is formed by cascading multiple units of shift register units. Each shift register unit outputs a gate driving signal to one of a plurality of gate lines. The gate driving signals from the gate driving circuit scan through gate lines row by row, controlling each row of transistors to be in on/off states. The gate drive circuit can be integrated into a gate-on-array (GOA) circuit, which can be formed directly in the array substrate of the display panel.

SUMMARY

In one aspect, the present disclosure provides a scan circuit, comprising a plurality of stages; wherein a respective scan unit of the scan circuit in the respective stage of the plurality of stages comprises an input subcircuit, an output subcircuit, a first processing subcircuit, a second processing subcircuit, and a third processing subcircuit; wherein the respective scan unit comprises a first capacitor in the second processing subcircuit; a third capacitor in the third processing subcircuit; an eighth transistor in the first processing subcircuit; and a ninth transistor and a tenth transistor in the output subcircuit; wherein, along the first direction, the eighth transistor is on a side of the ninth transistor and the tenth transistor away from the first capacitor, the third capacitor, and other transistors of the respective scan unit.

Optionally, the respective scan unit comprises a first connecting line in a first signal line layer, a second connecting line in a first conductive layer; the first connecting line is a first unitary structure electrically connecting a first electrode of a sixth transistor in the second processing subcircuit, a gate electrode of a seventh transistor in the second processing subcircuit, a gate electrode of a fourth transistor in the third processing subcircuit, and a second capacitor electrode of the third capacitor; the second connecting line and a first capacitor electrode of the first capacitor are parts of a second unitary structure, the second connecting line electrically connecting the first capacitor electrode of the first capacitor to a second electrode of a third transistor in the third processing subcircuit; and the first connecting line crosses over the second connecting line.

Optionally, the respective scan unit further comprises a third connecting line in the first signal line layer, the third connecting line electrically connecting the second connecting line, the second electrode of the third transistor, and a second electrode of a second transistor in the third processing subcircuit.

Optionally, the respective scan unit further comprises a fourth connecting line in the first conductive layer, the fourth connecting line and a first capacitor electrode of the third capacitor are parts of a third unitary structure, the fourth connecting line electrically connecting the first capacitor electrode of the third capacitor, a second electrode of a first transistor in the input subcircuit, and a second electrode of the fourth transistor; and the third connecting line crosses over the fourth connecting line.

Optionally, the respective scan unit further comprises a branch line extending away from the fourth connecting line; the branch line, the fourth connecting line, and the first capacitor electrode of the third capacitor are parts of the third unitary structure; and portions of the fourth connecting line and the branch line form a double-gate structure of a second transistor in the third processing subcircuit.

Optionally, the respective scan unit further comprises a fifth connecting line in the first signal line layer, the fifth connecting line electrically connecting the second electrode of the first transistor, the second electrode of the fourth transistor, and the fourth connecting line; the fourth connecting line extends along a first direction; and the fifth connecting line extends along a second direction different from the first direction.

Optionally, the scan circuit further comprises a second clock signal line in the first signal line layer; and a sixth connecting line in the first conductive layer; wherein the sixth connecting line electrically connects the first connecting line and the second clock signal line; and the sixth connecting line comprises the gate electrode of the fourth transistor.

Optionally, the scan circuit further comprises a first clock signal line in the first signal line layer; and a seventh connecting line in the first conductive layer; wherein the seventh connecting line electrically connects a first electrode of a second transistor in the third processing subcircuit and the first clock signal line; and the seventh connecting line comprises a gate electrode of a first transistor in the input subcircuit and a gate electrode of the third transistor.

Optionally, the respective scan unit further comprises an eighth connecting line in the first signal line layer electrically connecting the seventh connecting line and the first electrode of the second transistor; the seventh connecting line extends along a first direction; and the eighth connecting line extends along a second direction different from the first direction.

Optionally, the respective scan unit further comprises a ninth connecting line in the first signal line layer, the ninth connecting line electrically connecting a second capacitor electrode of the first capacitor to a second electrode of the sixth transistor and a first electrode of the seventh transistor; and an orthographic projection of the ninth connecting line on a base substrate partially overlaps with an orthographic projection of the second capacitor electrode of the first capacitor on the base substrate.

Optionally, an orthographic projection of the first connecting line on a base substrate partially overlaps with an orthographic projection of the second capacitor electrode of the third capacitor on the base substrate.

Optionally, the second connecting line, the first capacitor electrode of the first capacitor, a gate electrode of a fifth transistor in the third processing subcircuit, and a gate electrode of the sixth transistor are parts of the second unitary structure.

Optionally, the respective scan unit comprises a second capacitor in a first processing subcircuit; and wherein the ninth transistor and the tenth transistor are arranged along a second direction; the first capacitor, the third capacitor, the second capacitor are sequentially arranged along the first direction; and along the first direction, the second capacitor is on a side of the ninth transistor and the tenth transistor away from the first capacitor and the third capacitor.

Optionally, the scan circuit further comprises a first voltage signal line and a second voltage signal line in the first signal line layer; wherein, along the first direction, the first voltage signal line and the second voltage signal line are on two opposite sides of transistors and capacitors of the respective scan unit; the first voltage signal line is electrically coupled to a first electrode of a fifth transistor in the third processing subcircuit, a first electrode of an eighth transistor in the first processing subcircuit, and a first electrode of the ninth transistor in the output subcircuit; and the second voltage signal line is electrically coupled to a first electrode of the tenth transistor in the output subcircuit.

Optionally, a channel length of an active layer of the ninth transistor is equal to or less than 3.8 µm; a channel length of the active layer of the tenth transistor is equal to or less than 3.8 µm; a channel width of the active layer of the ninth transistor is greater than 180 µm; and a channel width of the active layer of the tenth transistor is greater than 180 µm.

Optionally, an active layer of the fourth transistor in the third processing subcircuit and an active layer of a fifth transistor in the third processing subcircuit are parts of a fourth unitary structure; and a ratio of a channel width of the active layer of the fourth transistor to a channel width of the active layer of the fifth transistor is in a range of 1.5:1 to 2.5:1.

Optionally, the respective scan unit further comprises a fifth connecting line in the first signal line layer, the fifth connecting line electrically connecting the second electrode of the first transistor, the second electrode of the fourth transistor, and the fourth connecting line; and an active layer of the first transistor, the fifth connecting line, an active layer of the fourth transistor in the third processing subcircuit, an active layer of a fifth transistor in the third processing subcircuit, are colinear and arranged sequentially along a second direction.

Optionally, an active layer of the first transistor and an active layer of the third transistor extend in parallel and along a second direction.

In another aspect, the present disclosure provides a display apparatus, comprising the scan circuit described herein or fabricated by a method described herein, and a display panel.

Optionally, the display apparatus further comprises a second scan circuit; wherein the scan circuit is configured to provide a control signal of a first type; the second scan circuit is configured to provide a control signal of a second type; the scan circuit and the second scan circuit are arranged along a first direction; the display apparatus further comprises, along the first direction, a first voltage signal line and a second voltage signal line configured to provide a first voltage signal and a second voltage signal to the scan circuit, and a third voltage signal line and a fourth voltage signal line configured to provide the first voltage signal and the second voltage signal to the second scan circuit; wherein the respective scan unit further comprises a tenth connecting line connecting a second capacitor electrode of a second capacitor in the respective scan unit to the third voltage signal line; the tenth connecting line crosses over multiple signal lines extending along a second direction and configured to provide signals to the second scan circuit; and the tenth connecting line and the second capacitor electrode of the second capacitor in the respective scan unit are parts of a fifth unitary structure.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a scan circuit and a display apparatus that substantially obviate one or more of the problems due to limitations and disadvantages of the related art. In one aspect, the present disclosure provides a scan circuit. In some embodiments, the scan circuit includes a plurality of stages. A respective scan unit of the scan circuit in the respective stage of the plurality of stages includes an input subcircuit, an output subcircuit, a first processing subcircuit, a second processing subcircuit, and a third processing subcircuit. Optionally, the respective scan unit includes a first connecting line in a first signal line layer, a second connecting line in a first conductive layer, a first capacitor in the second processing subcircuit, and a third capacitor in the third processing subcircuit. Optionally, the first connecting line is a first unitary structure electrically connecting a first electrode of a sixth transistor in the second processing subcircuit, a gate electrode of a seventh transistor in the second processing subcircuit, a gate electrode of a fourth transistor in the third processing subcircuit, and a second capacitor electrode of the third capacitor. Optionally, the second connecting line and a first capacitor electrode of the first capacitor are parts of a second unitary structure, the second connecting line electrically connecting the first capacitor electrode of the first capacitor to a second electrode of a third transistor in the third processing subcircuit. Optionally, the first connecting line crosses over the second connecting line.

Figure 1:
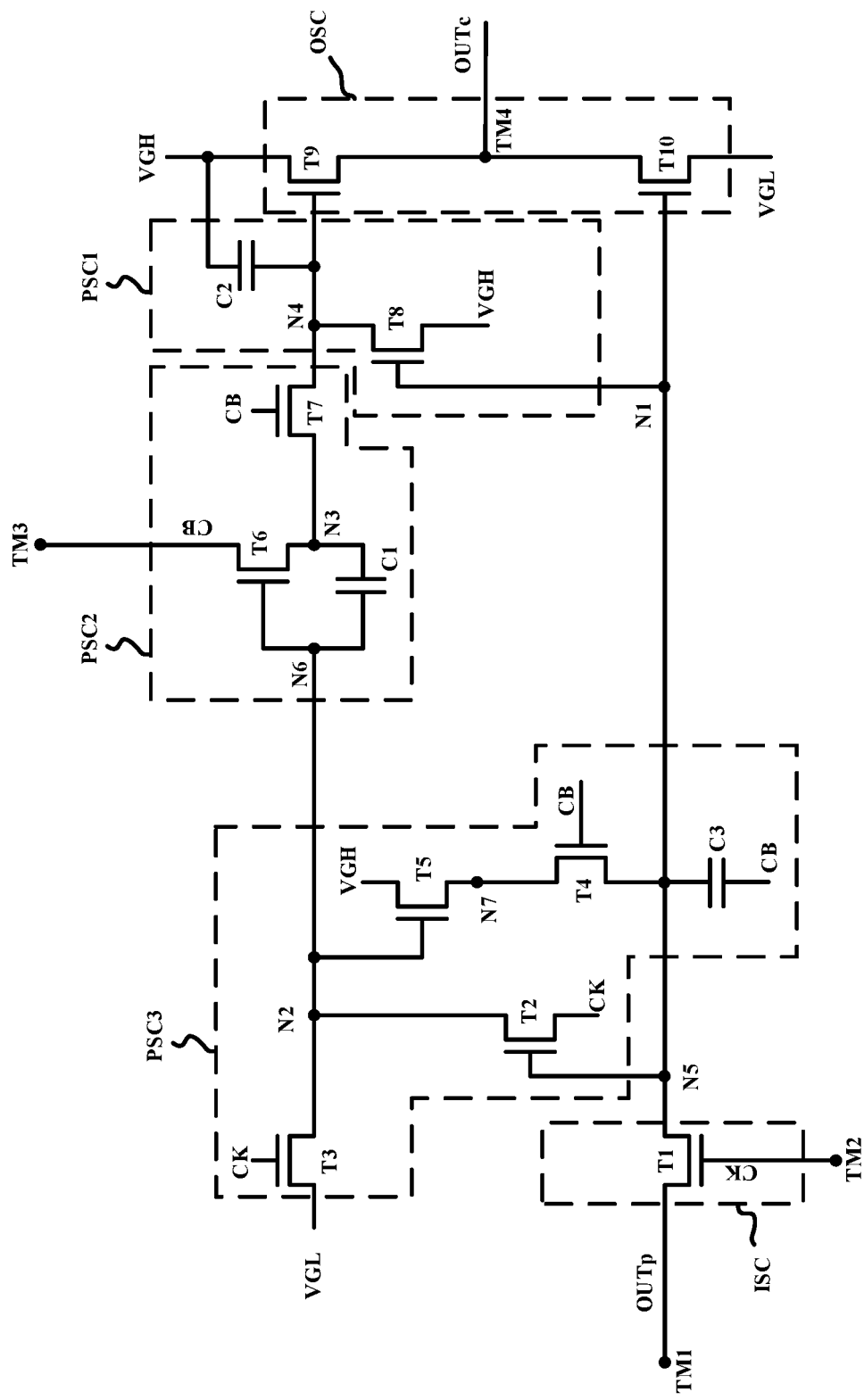
FIG. 1 is a circuit diagram of a respective scan unit in some embodiments according to the present disclosure.

Various appropriate structures may be implemented in the present scan circuit. FIG. 1 is a circuit diagram of a respective scan unit in some embodiments according to the present disclosure. Referring to FIG. 1, the respective scan unit in some embodiments includes an input subcircuit ISC, an output subcircuit OSC, a first processing subcircuit PSC1, a second processing subcircuit PSC2, and a third processing subcircuit PSC3.

In some embodiments, the output subcircuit OSC is configured to supply the voltage of a first power supply VGH or a second power supply VGL to an output terminal TM4 in response to voltages of a fourth node N4 and a first node N1. Optionally, the output subcircuit OSC includes a ninth transistor T9 and a tenth transistor T10.

The ninth transistor T9 is coupled between a first power supply VGH and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the first power supply VGH is provided to the output terminal TM4, which (annotated as Outc in FIG. 1) may be transmitted to a n-th gate line and used as a gate driving signal having a gate-on level.

The tenth transistor T10 is coupled between the output terminal TM4 and a second power supply VGL. A gate electrode of the tenth transistor T10 is coupled to the first node N1. The tenth transistor T10 may be turned on or off depending on the voltage of the first node N1. Optionally, when the tenth transistor T10 is turned on, the voltage of the second power supply VGL is provided to the output terminal TM4, which (annotated as Outc in FIG. 1) may be provided to a n-th gate line and used as a gate driving signal having a gate-off level. In one example, when the gate driving signal has a gate-off level, it may be understood that the gate driving signal is not provided.

In some embodiments, the input subcircuit ISC is configured to control the voltages of the first node NI and a fifth node N5 in response to signals provided to the first input terminal TM1 and the second input terminal TM2, respectively. Optionally, the input subcircuit ISC includes a first transistor T1.

The first transistor T1 is coupled between the first input terminal TM1 and the fifth node N5. A gate electrode of the first transistor T1 is coupled to the second input terminal TM2. When the first clock signal CK is provided to the second input terminal TM2, the first transistor T1 is turned on to electrically couple the first input terminal TM1 with the fifth node N5.

In some embodiments, the first processing subcircuit PSC1 is configured to control the voltage of the fourth node N4 in response to the voltages of the first node N1. Optionally, the first processing subcircuit PSC1 includes an eighth transistor T8 and a second capacitor C2.

The eighth transistor T8 is coupled between the first power supply VGH and the fourth node N4. A gate electrode of the eighth transistor T8 is coupled to the first node N1. The eighth transistor T8 may be turned on or off depending on the voltage of the first node N1. Optionally, when the eighth transistor T8 is turned on, the voltage of the first power supply VGH may be provided to the fourth node N4.

The second capacitor C2 is coupled between the first power supply VGH and the fourth node N4. Optionally, the second capacitor C2 is configured to charge a voltage to be applied to the fourth node N4. Optionally, the second capacitor C2 is configured to maintain the voltage of the fourth node N4.

In some embodiments, the second processing subcircuit PSC2 is coupled to a sixth node N6, and is configured to control the voltage of the fourth node N4 in response to a signal input to the third input terminal TM3. Optionally, the second processing subcircuit PSC2 includes a sixth transistor T6, a seventh transistor T7, and a first capacitor C1.

A first terminal of the first capacitor C1 is coupled to the sixth node N6, and a second terminal of the first capacitor C1 is coupled to a third node N3 that is a common node between the sixth transistor T6 and the seventh transistor T7.

The sixth transistor T6 is coupled between the third node N3 and the sixth node N6. A gate electrode of the sixth transistor T6 is coupled to the sixth node N6. The sixth transistor T6 may be turned on depending on the voltage of the sixth node N6 so that a voltage corresponding to the second clock signal CB provided to the third input terminal TM3 may be applied to the third node N3.

The seventh transistor T7 is coupled between the fourth node N4 and the third node N3. A gate electrode of the seventh transistor T7 is coupled to the third input terminal TM3. The seventh transistor T7 may be turned on in response to an effective voltage of the second clock signal CB provided to the third input terminal TM3. As used herein, an effective voltage refers to a low voltage in the context of p-type transistors and to a high voltage in the context of n-type transistors; and an ineffective voltage refers to a high voltage in the context of p-type transistors and to a low voltage in the context of n-type transistors.

In some embodiments, the third processing subcircuit PSC3 is configured to control the voltage of the second node N2. Optionally, the third processing subcircuit PSC3 includes a second transistor T2, a third transistor T3, a fourth transistor T4, a fifth transistor T5, and a third capacitor C3.

A first electrode of the third capacitor C3 is coupled to the first node N1, and a second electrode of the third capacitor C3 is coupled to the third input terminal TM3. The third capacitor C3 is configured to stabilize the voltage level at the first node N1 or at the fifth node N5.

The fifth transistor T5 is coupled between the first power supply VGH and the seventh node N7. A gate electrode of the fifth transistor T5 is coupled to the second node N2. The fifth transistor T5 may be turned on or off depending on the voltage of the second node N2.

The fourth transistor T4 is coupled between the seventh node N7 and the first node N1. A gate electrode of the fourth transistor T4 is coupled to the third input terminal TM3. The fourth transistor T4 may be turned on or off in response to the second clock signal CB provided to the third input terminal TM3.

The second transistor T2 is coupled between the second node N2 and the second input terminal TM2. A gate electrode of the second transistor T2 is coupled to the fifth node N5.

The third transistor T3 is coupled between the second node N2 and the second power supply VGL. A gate electrode of the third transistor T3 is coupled to the second input terminal TM2. When the first clock signal CK is provided to the second input terminal TM2, the third transistor T3 may be turned on so that the voltage of the second power supply VGL may be provided to the second node N2.

In some embodiments, each of the first to twelfth transistors T1 to T10 may be formed of a p-type transistor. In some embodiments, in the context of p-type transistors, the gate-on voltage of the first to tenth transistors T1 to T10 may be set to a low level, and the gate-off voltage thereof may be set to a high level.

In some embodiments, each of the first to twelfth transistors T1 to T10 may be formed of an n-type transistor. In some embodiments, in the context of n-type transistors, the gate-on voltage of the first to tenth transistors T1 to T10 may be set to a high level, and the gate-off voltage thereof may be set to a low level.

Figure 2:
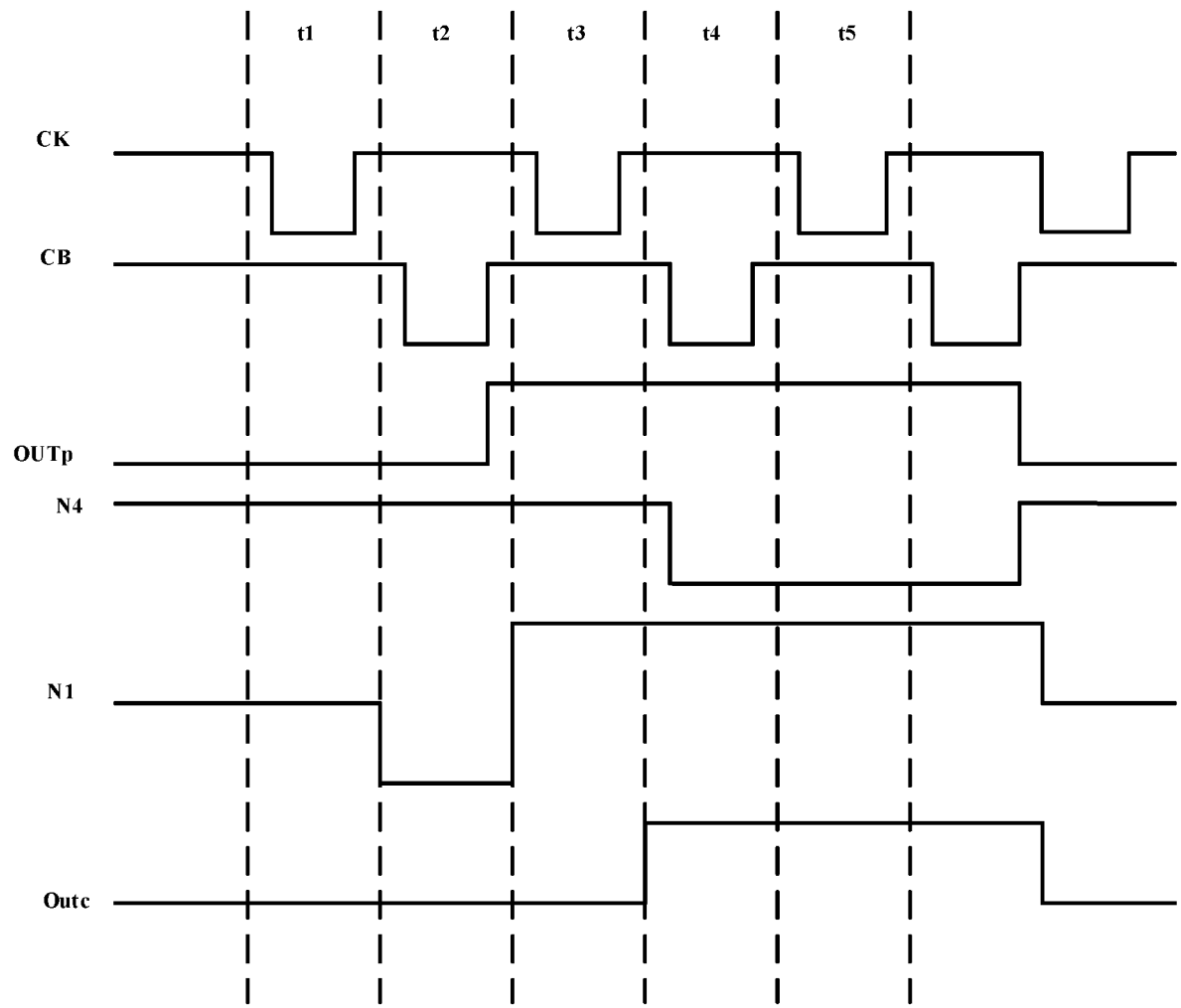
FIG. 2 is a timing diagram illustrating an operation of the scan unit of the stage illustrated in FIG. 1.

FIG. 2 is a timing diagram illustrating an operation of the scan unit of the stage illustrated in FIG. 1. Referring to FIG. 2, the first clock signal CK and the second clock signal CB each may have a cycle of two horizontal periods (2H), and have a gate-on level during different horizontal periods. Optionally, the second clock signal CB may be set to a signal shifted by a half cycle (i.e., one horizontal period (1H)) from the first clock signal CK.

In some embodiments, when the clock signals CK and CB are provided, the second input terminal TM2 and the third input terminal TM3 may be set to the low level, i.e., the voltage of the second power supply VGL. When the clock signals CK and CB are not provided, the second input terminal TM2 and the third input terminal TM3 may be set to the high level, i.e., the voltage of the first power supply VGH.

In some embodiments, when a start signal STV or an output signal Outp from an output terminal of a previous scan unit (e.g., a previous scan unit of a same stage or a previous scan unit of a previous stage) is provided, the first input terminal TM1 may be set to the high level, i.e., the voltage of the first power supply VGH. When the start signal STV or the output signal Outp from the output terminal of the previous scan unit is not provided, the first input terminal TM1 may be set to the low level, i.e., the voltage of the second power supply VGL.

In some embodiments, the start signal STV or the output signal Outp from the output terminal of the previous scan unit to be provided to the first input terminal TM1 may be set to overlap at least once with the first clock signal CK to be provided to the second input terminal TM2. Optionally, the start signal STV or the output signal Outp from the output terminal of the previous scan unit may have a width greater than that of the first clock signal CK and, for example, be provided during four horizontal periods (4H). In this case, an output signal to be provided to the first input terminal TM1 of the next stage may also overlap at least once with the second clock signal CB to be provided to the second input terminal TM2 of the next stage.

In some embodiments, during a first period t1, the first clock signal CK is provided to the second input terminal TM2. The first transistor T1 and the third transistor T3 are turned on. Furthermore, during the first period t1, the second clock signal CB is not provided to the third input terminal TM3, the seventh transistor T7 is turned off.

In some embodiments, when the first transistor T1 is turned on, the first input terminal TM1 and the fifth node N5 are electrically coupled to each other. The first input terminal TM1 is electrically coupled with the first node N1 via the fifth node N5.

In some embodiments, during the first period t1, the start signal STV or the output signal Outp from the output terminal of the previous scan unit to be provided to the first input terminal TM1 has the low level, a low voltage (e.g., the voltage of the second power supply VGL) may be applied to the fifth node N5 and the first node N1. When the fifth node N5 and the first node N1 are set to the low voltage, the second transistor T2, the eighth transistor T8, and the tenth transistor T10 are turned on.

In some embodiments, the second clock signal CB is not provided to the third input terminal TM3 during the first period t1, a high voltage may be provided to the third capacitor C3.

In some embodiments, when the fourth transistor T4 is turned off, the fifth transistor T5 is connected in the form of a diode between the second node N2 and the first power supply VGH. When the fifth transistor T5 is turned on during the first period t1, the voltage of the first power supply VGH is not transmitted to the second node N2, and the voltage of the second node N2 is maintained at the voltage of the preceding state, e.g., the high voltage. The high voltage of the second node N2 is applied to the sixth node N6, and the sixth node N6 is set to the high voltage. The sixth transistor T6 is turned off.

In some embodiments, when the eighth transistor T8 is turned on, the voltage of the first power supply VGH is provided to the fourth node N4. The ninth transistor T9 is turned off.

In some embodiments, when the tenth transistor T10 is turned on, the voltage of the second power supply VGL is provided to the output terminal TM4. During the first period t1, the gate driving signal are not provided to the n-th stage gate line.

In some embodiments, during a second period t2, the supply of the first clock signal CK to the second input terminal TM2 is interrupted. The first transistor T1 and the fifth transistor T5 are turned off. The fourth node N4 and the first node N1 maintain the voltages of the preceding period by the second capacitor C2 and the third capacitor C3. Since the fourth node N4 remains in the high voltage state, the ninth transistor T9 remains turned off. Since the first node N1 remains in the low voltage state, the second transistor T2, the eighth transistor T8, and the tenth transistor T10 remain turned on.

In some embodiments, during the second period t2, the second clock signal CB is provided to the third input terminal TM3. The seventh transistor T7 is turned on by the second clock signal CB provided to the third input terminal TM3. When the seventh transistor T7 is turned on, the fourth node N4 and the third node N3 are electrically coupled to each other. The third node N3 is set to the high voltage.

In some embodiments, during the second period t2, the second clock signal CB is provided to the gate electrode of the fourth transistor T4 thereby turning on the fourth transistor T4. A low voltage is provided to the seventh node N7 via the fourth transistor T4. The voltage of the first node N1 is maintained at a voltage (a 2-step low voltage) less than the voltage of the second power supply VGL by coupling of the third capacitor C3.

In some embodiments, during a third period t3, the supply of the second clock signal CB to the third input terminal TM3 is interrupted. When the supply of the second clock signal CB is interrupted, the seventh transistor T7 is turned off.

In some embodiments, during the third period t3, the start signal STV or the output signal Outp from the output terminal of the previous scan unit is provided to the first input terminal TM1, and the first clock signal CK is provided to the second input terminal TM2. When the first clock signal CK is provided to the second input terminal TM2, the first transistor T1 and the third transistor T3 are turned on.

In some embodiments, when the first transistor T1 is turned on, the first input terminal TM1 and the fifth node N5 are electrically coupled to each other. The first input terminal TM1 is electrically coupled with the first node N1 via the fifth node N5. The fifth node N5 and the first node N1 are set to the high voltage by the start signal STV or the output signal Outp from the output terminal of the previous scan unit that is provided to the first input terminal TM1. When the fifth node N5 and the first node N1 are set to the high voltage, the second transistor T2, the eighth transistor T8, and the tenth transistor T10 are turned off.

In some embodiments, when the third transistor T3 is turned on, the low voltage of the second power supply VGL is applied to the second node N2 so that the second node N2 and the sixth node N6 are set to the low voltage. The fifth transistor T5 and the sixth transistor T6 may be turned on.

In some embodiments, when the sixth transistor T6 is turned on, the third input terminal TM3 and the third node N3 are electrically coupled to each other. Since the second clock signal CB is not provided to the third input terminal TM3 during the third period t3, the third node N3 is maintained at the high voltage. Since the seventh transistor T7 remains turned off, the voltage of the third node N3 does not affect the voltage of the fourth node N4. The first capacitor C1 is configured to store a voltage corresponding to the turn-on level of the sixth transistor T6.

In some embodiments, during a fourth period t4, the second clock signal CB may be provided to the third input terminal TM3. When the second clock signal CB is provided to the third input terminal TM3, the seventh transistor T7 is turned on.

In some embodiments, when the seventh transistor T7 is turned on, the fourth node N4 and the third node N3 are electrically coupled to each other. The low voltage of the second clock signal CB that is provided to the third input terminal TM3 via the sixth transistor T6 that remains turned on is provided to the third node N3 and the fourth node N4. When the low voltage is provided to the fourth node N4, the ninth transistor T9 is turned on.

In some embodiments, when the ninth transistor T9 is turned on, the voltage of the first power supply VGH is provided to the output terminal TM4. The voltage of the first power supply VGH that is provided to the output terminal TM4 is provided to the n-th stage gate line as the gate driving signal.

In some embodiments, during a fifth period t5, the supply of the second clock signal CB to the third input terminal TM3 is interrupted. When the supply of the second clock signal CB is interrupted, the seventh transistor T7 is turned off. The fourth node N4 is stably maintained at the high voltage by the second capacitor C2. The ninth transistor T9 remains turned on, and the voltage of the first power supply VGH is provided to the n-th stage gate line as the gate driving signal.

Figure 3A:
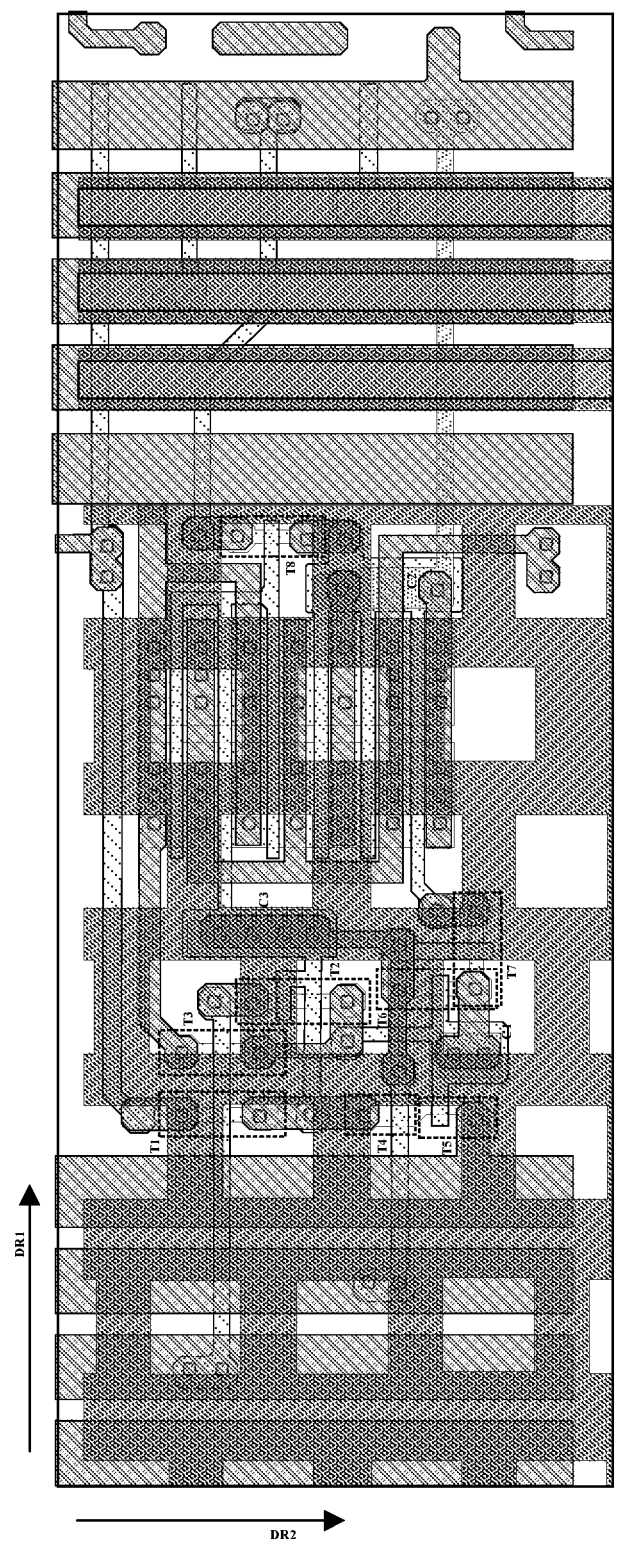
FIG. 3A illustrates the structure of a respective scan unit in a scan circuit in some embodiments according to the present disclosure.
Figure 3B:
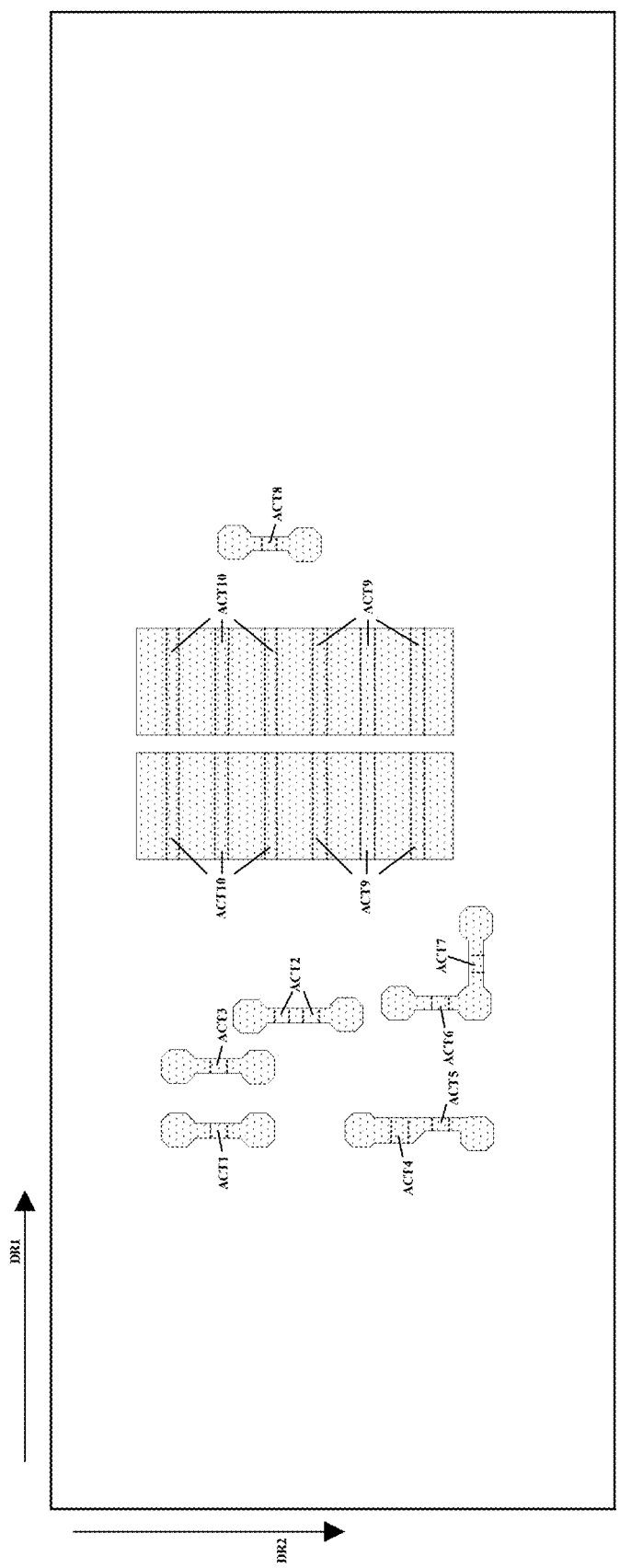
FIG. 3B illustrates the structure of a semiconductor material layer in the respective scan unit depicted in FIG. 3A.
Figure 3C:
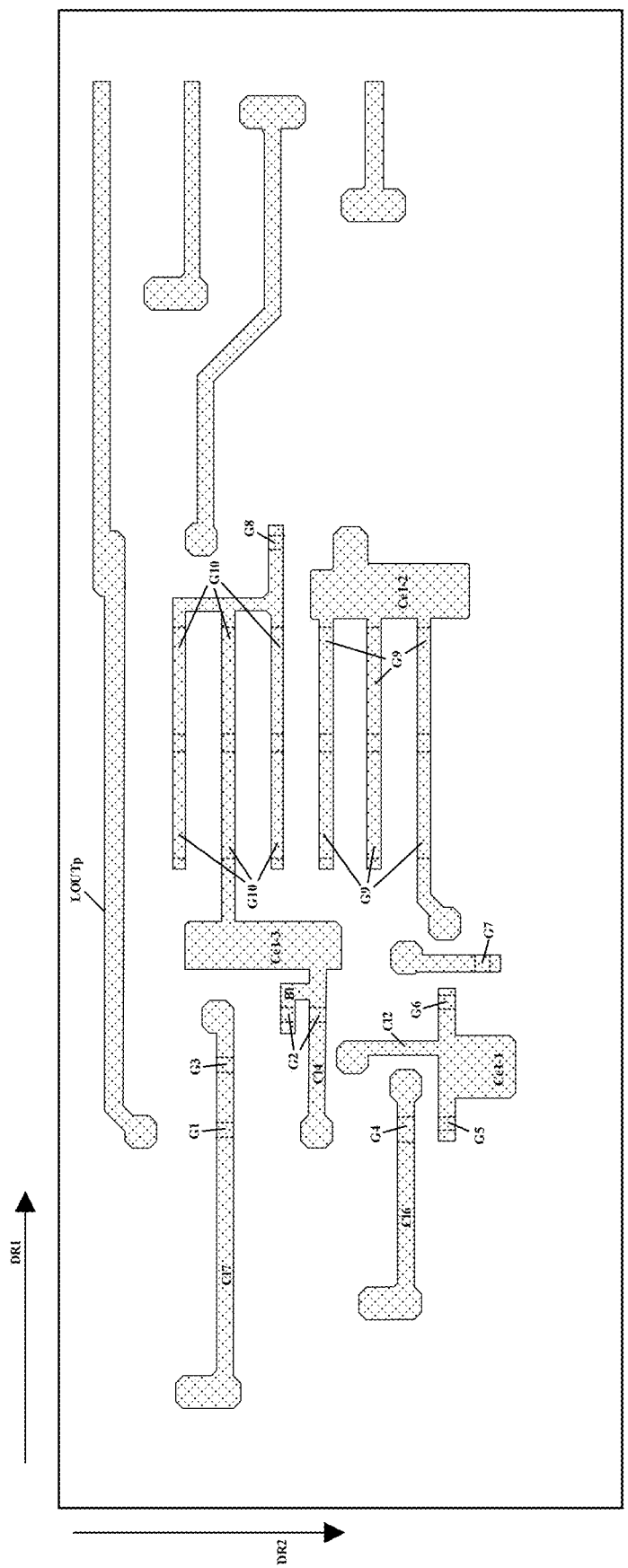
FIG. 3C illustrates the structure of a first conductive layer in the respective scan unit depicted in FIG. 3A.
Figure 3D:
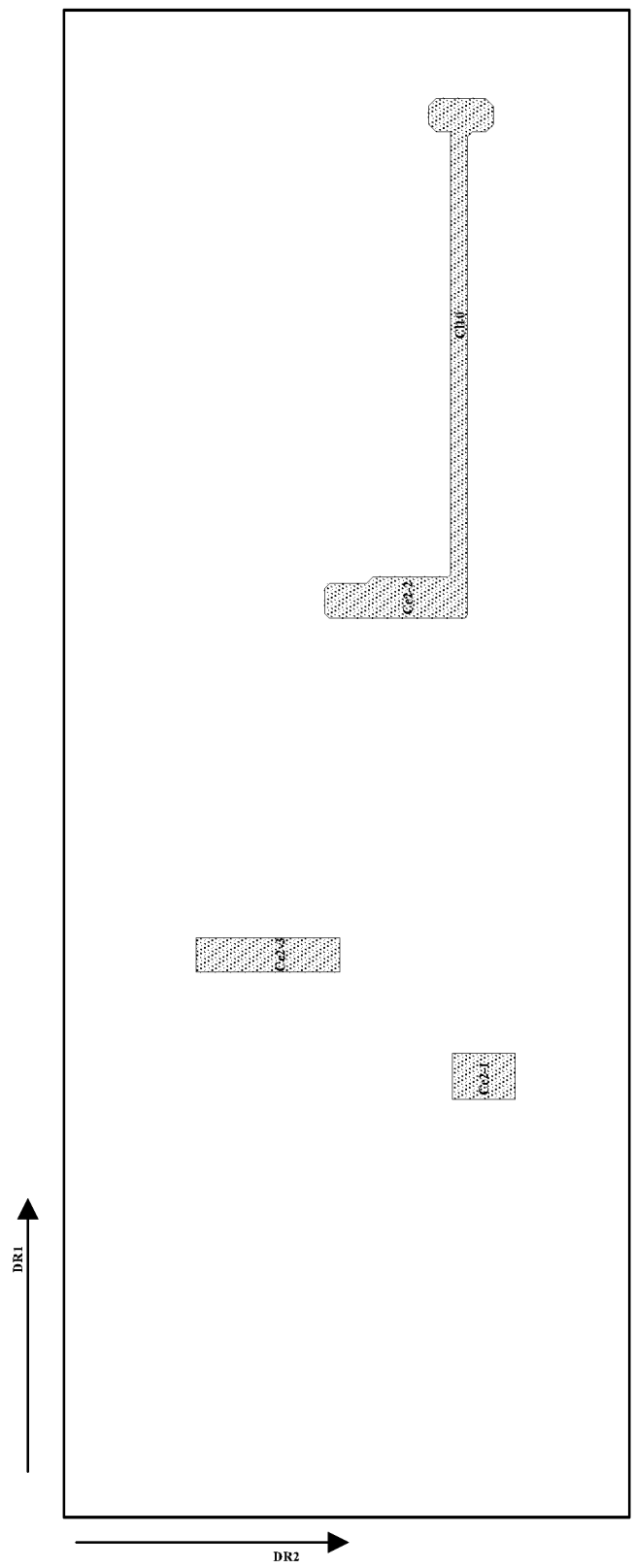
FIG. 3D illustrates the structure of a second conductive layer in the respective scan unit depicted in FIG. 3A.
Figure 3E:
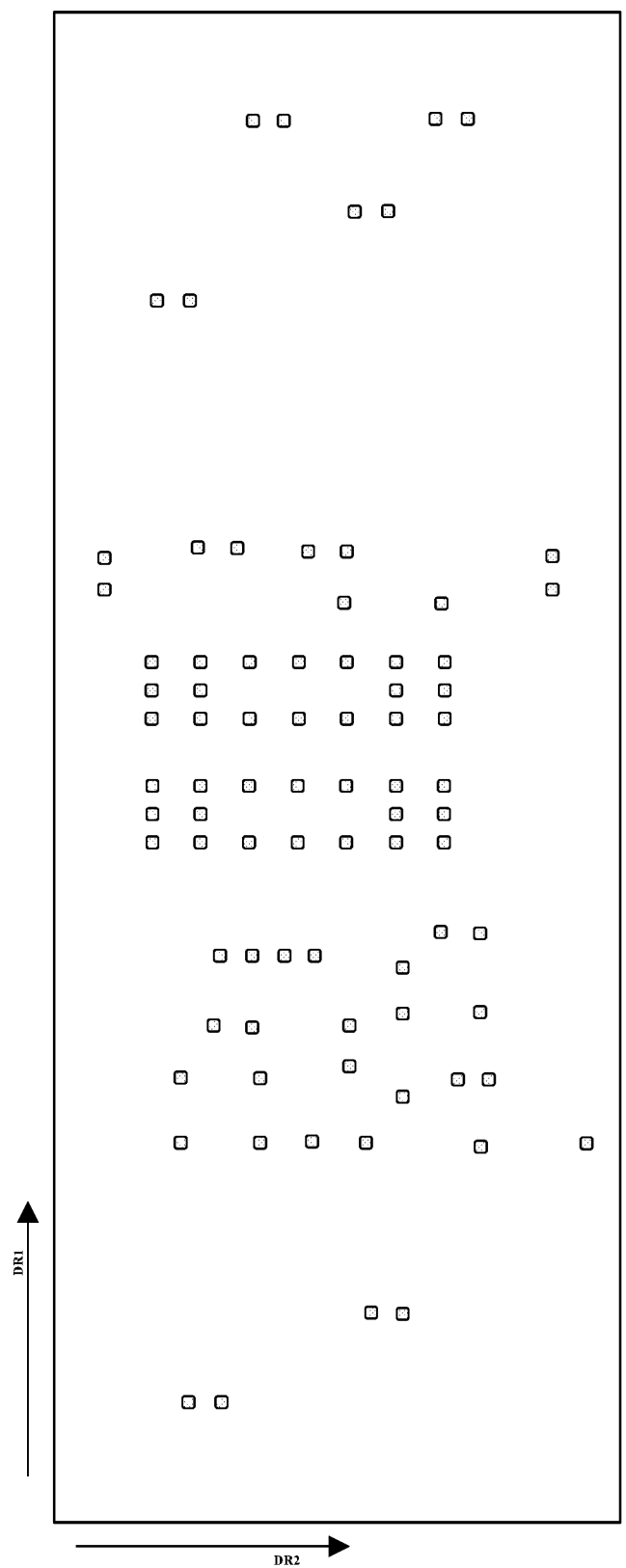
FIG. 3E illustrates the structure of an inter-layer dielectric layer in the respective scan unit depicted in FIG. 3A.
Figure 3F:
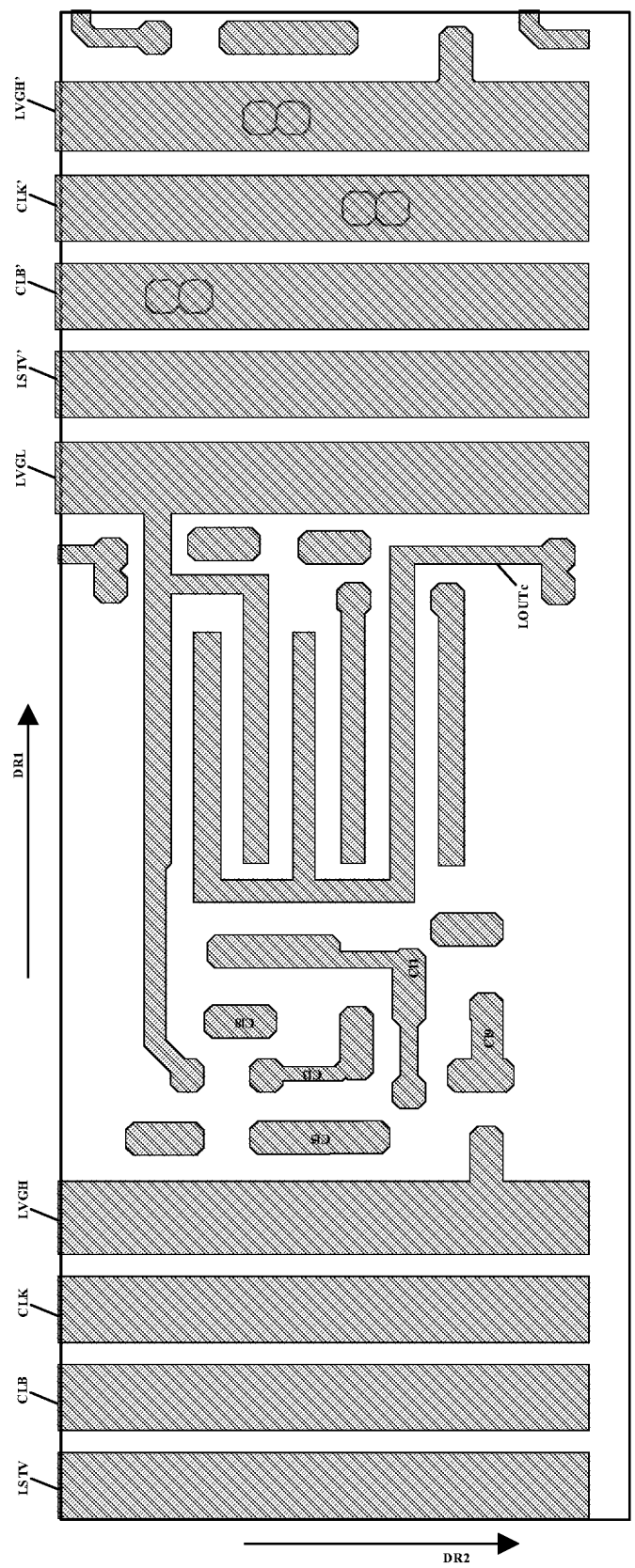
FIG. 3F illustrates the structure of a first signal line layer in the respective scan unit depicted in FIG. 3A.
Figure 3G:
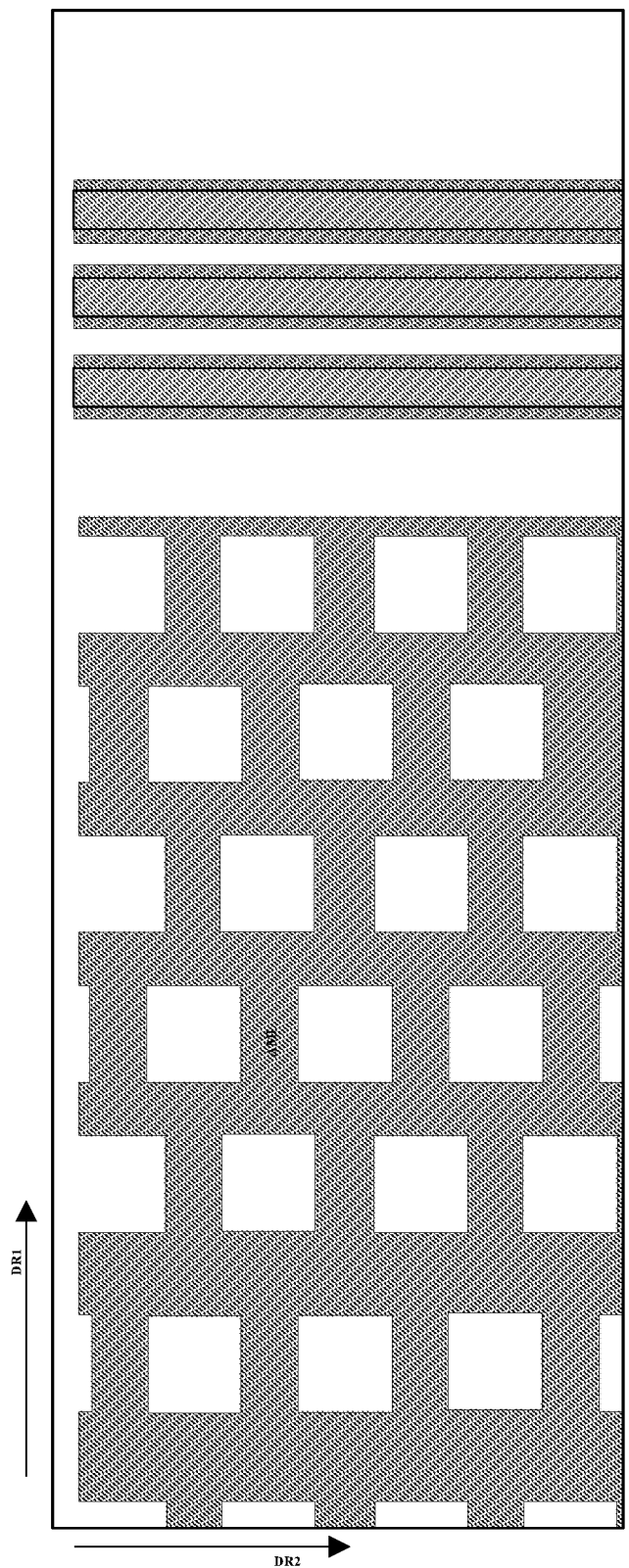
FIG. 3G illustrates the structure of a second signal line layer in the respective scan unit depicted in FIG. 3A.

FIG. 3A illustrates the structure of a respective scan unit in a scan circuit in some embodiments according to the present disclosure. FIG. 3B illustrates the structure of a semiconductor material layer in the respective scan unit depicted in FIG. 3A. FIG. 3C illustrates the structure of a first conductive layer in the respective scan unit depicted in FIG. 3A. FIG. 3D illustrates the structure of a second conductive layer in the respective scan unit depicted in FIG. 3A. FIG. 3E illustrates the structure of an inter-layer dielectric layer in the respective scan unit depicted in FIG. 3A. FIG. 3F illustrates the structure of a first signal line layer in the respective scan unit depicted in FIG. 3A. FIG. 3G illustrates the structure of a second signal line layer in the respective scan unit depicted in FIG. 3A. Referring to FIG. 3A to FIG. 3G, the respective scan unit of the scan circuit in the respective stage of the plurality of stages in some embodiments includes ten transistors (T1 to T10) and three capacitors (C1 to C3), as described in connection with FIG. 1 and FIG. 2 above.

Referring to FIG. 3A and FIG. 3B, the semiconductor material layer in some embodiments includes active layers of the respective scan unit, including an active layer ACT1 of the first transistor T1, an active layer ACT2 of the second transistor T2, an active layer ACT3 of the three transistor T3, an active layer ACT4 of the fourth transistor T4, an active layer ACT5 of the fifth transistor T5, an active layer ACT6 of the sixth transistor T6, an active layer ACT7 of the seventh transistor T7, an active layer ACT8 of the eighth transistor T8, an active layer ACT9 of the ninth transistor T9, and an active layer ACT10 of the tenth transistor T10.

In some embodiments, the active layer ACT1 of the first transistor T1 and the active layer ACT3 of the third transistor T3 are arranged along a first direction DR1. Referring to FIG. 3A to FIG. 3C, in some embodiments, a seventh connecting line C17 in the first conductive layer includes a gate electrode G1 of the first transistor T1 and a gate electrode G3 of the first transistor T3. In one example, the seventh connecting line C17 is a unitary structure.

In some embodiments, the active layer ACT1 of the first transistor T1, the active layer ACT4 of the fourth transistor T4, and the active layer ACT5 of the fifth transistor T5 are arranged along a second direction DR1. Optionally, at least portions of the active layer ACT4 of the fourth transistor T4 and the active layer ACT5 of the fifth transistor T5 are colinear along the second direction DR2.

In some embodiments, the second transistor T2 has a double-gate structure, and the active layer ACT2 of the second transistor T2 includes two portions.

In some embodiments, the ninth transistor T9 has a multiple-gate structure, and the active layer ACT9 of the ninth transistor T9 includes multiple portions arranged in rows and columns, e.g., two columns and three rows.

In some embodiments, the tenth transistor T10 has a multiple-gate structure, and the active layer ACT10 of the tenth transistor T10 includes multiple portions arranged in rows and columns, e.g., two columns and three rows.

In some embodiments, the active layer ACT4 of the fourth transistor T4 and the active layer ACT5 of the fifth transistor T5 are parts of a unitary structure extending along the second direction DR2. Optionally, a ratio of a channel width of the active layer ACT4 of the fourth transistor T4 to a channel width of the active layer ACT5 of the fifth transistor T5 is in a range of 1.5:1 to 2.5:1, e.g., 1.5:1 to 1.6:1, 1.6:1 to 1.7:1, 1.7:1 to 1.8:1, 1.8:1 to 1.9:1, 1.9:1 to 2.0:1, 2.0:1 to 2.1:1, 2.1:1 to 2.2:1, 2.2:1 to 2.3:1, 2.3:1 to 2.4:1, or 2.4:1 to 2.5:1.

Optionally, a ratio of a channel width of the active layer ACT4 of the fourth transistor T4 to a channel width of an active layer of the first transistor T1, the second transistor T2, the third transistor T3, the fifth transistor T5, the sixth transistor T6, the seventh transistor T7, or the eighth transistor T8 is in a range of 1.5:1 to 2.5:1, e.g., 1.5:1 to 1.6:1, 1.6:1 to 1.7:1, 1.7:1 to 1.8:1, 1.8:1 to 1.9:1, 1.9:1 to 2.0:1, 2.0:1 to 2.1:1, 2.1:1 to 2.2:1, 2.2:1 to 2.3:1, 2.3:1 to 2.4:1, or 2.4:1 to 2.5:1.

Optionally, a channel width of the active layer ACT9 of the ninth transistor T9 is greater than 180 μm, e.g., 180 μm to 200 μm, 200 μm to 220 μm, 220 μm to 240 μm, 240 μm to 260 μm, 260 μm to 280 μm, or 280 μm to 300 μm. Optionally, a channel width of the active layer ACT10 of the tenth transistor T10 is greater than 180 μm, e.g., 180 μm to 200 μm, 200 μm to 220 μm, 220 μm to 240 μm, 240 μm to 260 μm, 260 μm to 280 μm, or 280 μm to 300 μm. Optionally, the channel width of the active layer ACT10 of the tenth transistor T10 is greater than the channel width of the active layer ACT9 of the ninth transistor T9.

Optionally, a channel length of the active layer ACT9 of the ninth transistor T9 is equal to or less than 3.8 μm, e.g., 3.0 μm to 3.1 μm, 3.1 μm to 3.2 μm, 3.2 μm to 3.3 μm, 3.3 μm to 3.4 μm, 3.4 μm to 3.5 μm, 3.5 μm to 3.6 μm, 3.6 μm to 3.7 μm, or 3.7 μm to 3.8 μm. Optionally, a channel length of the active layer ACT10 of the tenth transistor T10 is equal to or less than 3.8 μm, e.g., 3.0 μm to 3.1 μm, 3.1 μm to 3.2 μm, 3.2 μm to 3.3 μm, 3.3 μm to 3.4 μm, 3.4 μm to 3.5 μm, 3.5 μm to 3.6 μm, 3.6 μm to 3.7 μm, or 3.7 μm to 3.8 μm.

Optionally, a ratio of a channel width to channel length of the active layer ACT4 of the fourth transistor T4 is in a range of 1.75 to 2. Optionally, a ratio of a channel width to channel length of an active layer of the first transistor T1, the second transistor T2, the third transistor T3, the fifth transistor T5, the sixth transistor T6, the seventh transistor T7, or the eighth transistor T8 is in a range of 0.92 to 0.95.

In some embodiments, the active layer ACT6 of the sixth transistor T6 and the active layer ACT7 of the seventh transistor T7 are parts of a unitary structure. The unitary structure includes a first portion extending along the first direction DR1 and a second portion extending along the second direction DR2, the first portion comprising the active layer ACT7 of the seventh transistor T7, and the second portion comprising the active layer ACT6 of the sixth transistor T6. Optionally, an included angle between the first portion and the second portion is in a range of 85 degrees to 95 degrees, e.g., 90 degrees.

Referring to FIG. 3A and FIG. 3C, the first conductive layer in some embodiments includes gate electrodes of the respective scan unit, including a gate electrode G1 of the first transistor T1, a gate electrode G2 of the second transistor T2, a gate electrode G3 of the three transistor T3, a gate electrode G4 of the fourth transistor T4, a gate electrode G5 of the fifth transistor T5, a gate electrode G6 of the sixth transistor T6, a gate electrode G7 of the seventh transistor T7, a gate electrode G8 of the eighth transistor T8, a gate electrode G9 of the ninth transistor T9, and a gate electrode G10 of the tenth transistor T10. In some embodiments, the first conductive layer further includes a first capacitor electrode Ce1-1 of the first capacitor C1, a first capacitor electrode Ce1-2 of the second capacitor C2, and a first capacitor electrode Ce1-3 of the third capacitor C3. In some embodiments, the first conductive layer further includes a second connecting line C12, a fourth connecting line C14, a sixth connecting line C16, and a seventh connecting line C17. In some embodiments, the first conductive layer further includes an output signal line LOutp from an output terminal of a previous scan unit, for example, when the respective scan unit is not in the first stage. The output signal line LOutp is electrically connected to a first electrode of the first transistor T1.

Referring to FIG. 3A and FIG. 3D, the second conductive layer in some embodiments includes a second capacitor electrode Ce2-1 of the first capacitor C1, a second capacitor electrode Ce2-2 of the second capacitor C2, and a second capacitor electrode Ce2-3 of the third capacitor C3. In some embodiments, the second conductive layer further includes a tenth connecting line C110.

Referring to FIG. 3E, vias extending through the interlayer dielectric layer is shown.

Referring to FIG. 3A and FIG. 3F, the first signal line layer in some embodiments includes a plurality of signal lines extending along the second direction DR2. The plurality of signal lines include a first voltage signal line LVGH, a second voltage signal lien LVGL, a start signal line LSTV, a first clock signal line CLK, and a second clock signal line CLB. FIG. 3F also shows a plurality of signal lines configured to provide signals to a second scan circuit adjacent to the scan circuit. The plurality of signal lines configured to provide signals to the second scan circuit include a third voltage signal line LVGH', a fourth voltage signal lien LVGL', a second start signal line LSTV', a third clock signal line CLK', and a fourth clock signal line CLB'. In some embodiments, the first signal line layer further includes an output signal line LOutc configured to output a control signal to one or more rows of subpixels in the respective stage. In some embodiments, the first signal line layer further includes a first connecting line C11, a third connecting line C13, a fifth connecting line C15, an eighth connecting line C18, and a ninth connecting line C19.

Referring to FIG. 3A and FIG. 3G, the second signal line layer in some embodiments includes an anode material layer AML.

Referring to FIG. 1, FIG. 2, and FIG. 3A to FIG. 3G, in some embodiments, the respective scan unit includes a first connecting line C11 in a first signal line layer, a second connecting line C12 in a first conductive layer, a first capacitor C1 in the second processing subcircuit PSC2, and a third capacitor C3 in the third processing subcircuit PSC3. The first connecting line C11 is a first unitary structure electrically connecting a first electrode of a sixth transistor T6 in the second processing subcircuit PSC2, a gate electrode G7 of a seventh transistor T7 in the second processing subcircuit PSC2, a gate electrode G4 of a fourth transistor T4 in the third processing subcircuit PSC3, and a second capacitor electrode Ce2-3 of the third capacitor C3. The second connecting line C12 and a first capacitor electrode Ce1-1 of the first capacitor C1 are parts of a second unitary structure. The second connecting line C12 electrically connects the first capacitor electrode Ce1-1 of the first capacitor C1 to a second electrode of a third transistor T3 in the third processing subcircuit PSC3. Optionally, the first connecting line C11 crosses over the second connecting line C12.

In some embodiments, the respective scan unit further includes a third connecting line C13 in the first signal line layer. The third connecting line C13 electrically connects the second connecting line C12, the second electrode of the third transistor T3 in the third processing subcircuit PSC3, and a second electrode of a second transistor T2 in the third processing subcircuit PSC3.

In some embodiments, the respective scan unit further includes a fourth connecting line C14 in the first conductive layer. The fourth connecting line C14 and a first capacitor electrode Ce1-3 of the third capacitor C3 are parts of a third unitary structure. The fourth connecting line C14 electrically connects the first capacitor electrode Ce1-3 of the third capacitor C3, a second electrode of a first transistor T1 in the input subcircuit ISC, and a second electrode of the fourth transistor T4 in the third processing subcircuit PSC3. Optionally, the third connecting line C13 crosses over the fourth connecting line C14.

In some embodiments, the respective scan unit further includes a branch line B1 extending away from the fourth connecting line C14. The branch line B1, the fourth connecting line C14, and the first capacitor electrode Ce1-3 of the third capacitor C3 are parts of the third unitary structure. Portions of the fourth connecting line C14 and the branch line B1 form a double-gate structure of a second transistor T2 in the third processing subcircuit PSC3.

In some embodiments, the respective scan unit further includes a fifth connecting line C15 in the first signal line layer. The fifth connecting line C15 electrically connects the second electrode of the first transistor T1 in the input subcircuit ISC, the second electrode of the fourth transistor T4 in the third processing subcircuit PSC3, and the fourth connecting line C14. Optionally, the fourth connecting line C14 extends along a first direction Dr1. Optionally, the fifth connecting line C15 extends along a second direction DR2 different from the first direction DR1.

In some embodiments, the scan circuit further includes a second clock signal line CLB in the first signal line layer; and a sixth connecting line C16 in the first conductive layer. Optionally, the sixth connecting line C16 electrically connects the first connecting line C11 and the second clock signal line CLB. Optionally, the sixth connecting line C16 includes the gate electrode of the fourth transistor T4 in the third processing subcircuit PSC3.

In some embodiments, the scan circuit further includes a first clock signal line CLK in the first signal line layer; and a seventh connecting line C17 in the first conductive layer. Optionally, the seventh connecting line electrically connects a first electrode of a second transistor T2 in the third processing subcircuit PSC3 and the first clock signal line CLK. Optionally, the seventh connecting line C17 includes a gate electrode of a first transistor T1 in the input subcircuit ISC and a gate electrode of the third transistor T3 in the third processing subcircuit PSC3.

In some embodiments, the respective scan unit further includes an eighth connecting line C18 in the first signal line layer electrically connecting the seventh connecting line C17 and the first electrode of the second transistor T2 in the third processing subcircuit PSC3. Optionally, the seventh connecting line C17 extends along a first direction DR1. Optionally, the eighth connecting line C18 extends along a second direction DR2 different from the first direction DR1.

In some embodiments, the respective scan unit further includes a ninth connecting line C19 in the first signal line layer. The ninth connecting line C19 electrically connects a second capacitor electrode Ce2-1 of the first capacitor C1 to a second electrode of the sixth transistor T6 in the second processing subcircuit PSC2 and a first electrode of the seventh transistor T7 in the second processing subcircuit PSC2. Optionally, an orthographic projection of the ninth connecting line C19 on a base substrate partially overlaps with an orthographic projection of the second capacitor electrode Ce2-1 of the first capacitor C1 on the base substrate.

In some embodiments, an orthographic projection of the first connecting line C11 on a base substrate partially overlaps with an orthographic projection of the second capacitor electrode Ce2-3 of the third capacitor C3 on the base substrate.

In some embodiments, the second connecting line C12, the first capacitor electrode Ce1-1 of the first capacitor C1, a gate electrode of a fifth transistor T5 in the third processing subcircuit PSC3, and a gate electrode of the sixth transistor T6 in the second processing subcircuit are parts of a second unitary structure.

In some embodiments, the respective scan unit includes a second capacitor C2 in a first processing subcircuit PSC1; and a ninth transistor T9 and a tenth transistor T10 in the output subcircuit OSC. In some embodiments, the ninth transistor T9 and the tenth transistor T10 are arranged along a second direction Dr2. Optionally, the first capacitor C1, the third capacitor C3, the second capacitor C2 are sequentially arranged along a first direction DR1. Optionally, along the first direction DR1, the second capacitor C2 is on a side of the ninth transistor T9 and the tenth transistor T10 away from the first capacitor C1 and the third capacitor C3.

In some embodiments, the respective scan unit includes an eighth transistor T8 in the first processing subcircuit PSC1. Optionally, along the first direction DR1, the eighth transistor T8 is on a side of the ninth transistor T9 and the tenth transistor T10 away from the first capacitor C1, the third capacitor C3, and other transistors of the respective scan unit.

In some embodiments, the respective scan unit further includes a first voltage signal line LVGH and a second voltage signal line LVGL in the first signal line layer. Optionally, along the first direction DR1, the first voltage signal line LVGH and the second voltage signal line LVGL are on two opposite sides of transistors and capacitors of the respective scan unit. Optionally, the first voltage signal line LVGH is electrically coupled to a first electrode of a fifth transistor T1 in the third processing subcircuit PSC3, a first electrode of an eighth transistor T8 in the first processing subcircuit PSC1, and a first electrode of a ninth transistor T9 in the output subcircuit OSC. Optionally, the second voltage signal line LVGL is electrically coupled to a first electrode of a tenth transistor T10 in the output subcircuit OSC.

In some embodiments, the scan circuit includes a plurality of signal lines in the first signal line layer extending along a second direction DR2. Among the plurality of signal lines, the first voltage signal line LVGH and the second voltage signal line LVGL are closest to the transistors and capacitors of the respective scan unit.

In some embodiments, an active layer of the fourth transistor T4 in the third processing subcircuit PSC3 and an active layer of a fifth transistor T5 in the third processing subcircuit PSC3 are parts of a fourth unitary structure. Optionally, a ratio of a channel width of the active layer of the fourth transistor T4 to a channel width of the active layer of the fifth transistor T5 is in a range of 1.5:1 to 2.5:1.

In some embodiments, the respective scan unit further includes a fifth connecting line C15 in the first signal line layer. The fifth connecting line C15 electrically connects the second electrode of the first transistor T1 in the input subcircuit ISC, the second electrode of the fourth transistor T4 in the third processing subcircuit PSC3, and the fourth connecting line C14. Optionally, an active layer of the first transistor T1 in the input subcircuit ISC, the fifth connecting line C15, an active layer of the fourth transistor T4 in the third processing subcircuit PSC3, an active layer of a fifth transistor T5 in the third processing subcircuit PSC3, are colinear and arranged sequentially along a second direction DR2.

In some embodiments, an active layer of the first transistor T1 and an active layer of the third transistor T3 extend in parallel and along a second direction DR2.

In another aspect, the present invention provides a display apparatus, including the scan circuit described herein or fabricated by a method described herein, and a display panel having a plurality of light emitting elements. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus. Optionally, the display apparatus is a quantum dots display apparatus.

Figure 3H:
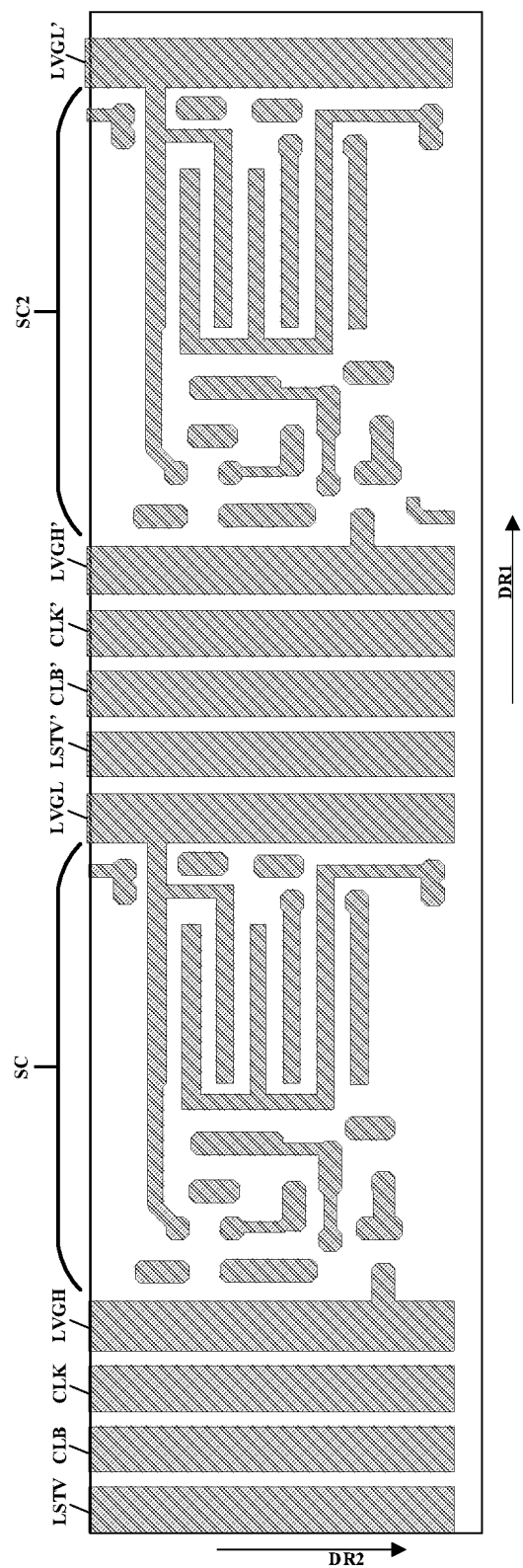
FIG. 3H illustrates the structure of a first signal line layer in a scan circuit and a second scan circuit in some embodiments according to the present disclosure.

In some embodiments, the display apparatus further includes a second scan circuit. The scan circuit described herein is configured to provide a control signal of a first type; and the second scan circuit is configured to provide a control signal of a second type. The control signal of the first type and the control signal of the second type are different from each other. In one example, the control signal of the first type is a light emitting control signal. In another example, the control signal of the second type is a reset control signal. Optionally, the scan circuit and the second scan circuit are arranged along a first direction DR1. FIG. 3H illustrates the structure of a first signal line layer in a scan circuit and a second scan circuit in some embodiments according to the present disclosure. Referring to FIG. 3H, the display apparatus in some embodiments further includes, along the first direction DR1, a first voltage signal line LVGH and a second voltage signal line LVGL configured to provide a first voltage signal and a second voltage signal to the scan circuit SC, and a third voltage signal line LVGH' and a fourth voltage signal line LVGL' configured to provide the first voltage signal and the second voltage signal to the second scan circuit SC2.

In some embodiments, the respective scan unit further includes a tenth connecting line C110 connecting a second capacitor electrode Ce2-2 of a second capacitor C2 in the scan unit to the third voltage signal line LVGH'. Optionally, the tenth connecting line C110 crosses over multiple signal lines extending along a second direction DR2 and configured to provide signals to the second scan circuit. Optionally, the tenth connecting line C110 and the second capacitor electrode Ce2-2 of the second capacitor C2 in the scan unit are parts of a fifth unitary structure.

The scan circuit described in the present disclosure may be used for generating various appropriate control signals to subpixels in a display panel. In one example, the scan circuit described in the present disclosure is a light emitting control signal generating circuit configured to generate light emitting control signals for subpixels in a display panel. In another example, the scan circuit described in the present disclosure is a gate scanning signal generating circuit configured to generate gate scanning signals for subpixels in a display panel. In another example, the scan circuit described in the present disclosure is a reset control signal generating circuit configured to generate reset control signals for subpixels in a display panel.

Figure 4:
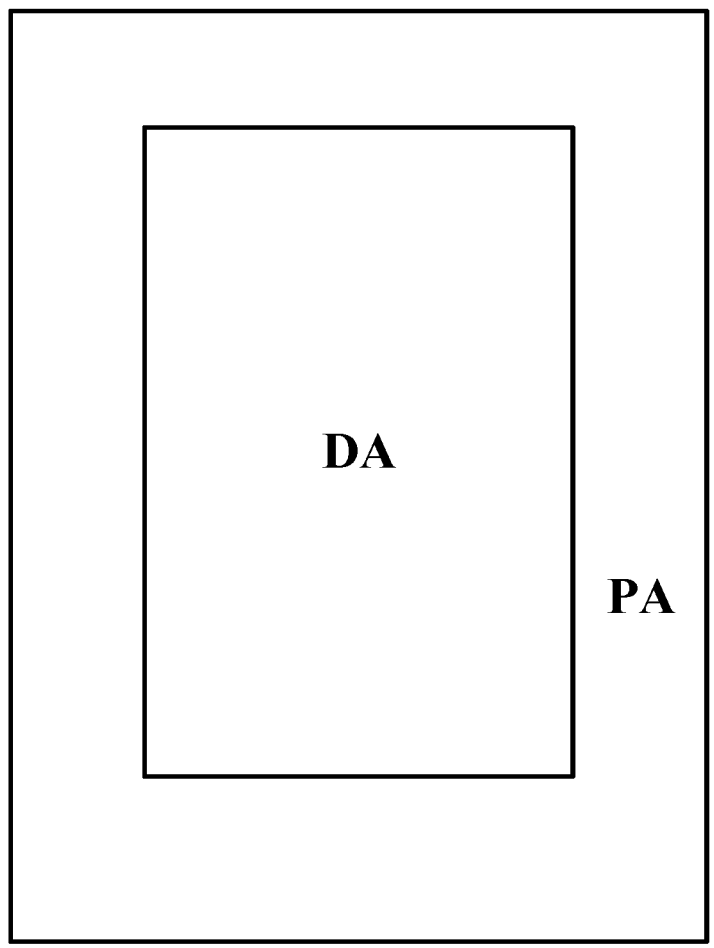
FIG. 4 is a schematic diagram illustrating a display region and a peripheral area in a display apparatus in some embodiments according to the present disclosure.

FIG. 4 is a schematic diagram illustrating a display region and a peripheral area in a display apparatus in some embodiments according to the present disclosure. Referring to FIG. 4, in some embodiments, the display apparatus includes a display region DA and a peripheral area PA. As used herein, the term "display region" refers to an area of a display panel where image is actually displayed. Optionally, the display region may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

The scan circuit in some embodiments is in the peripheral area. As used herein the term "peripheral area" refers to an area of a display panel where various circuits (for example, the scan circuit) and wires are provided to transmit signals to the display panel. To increase the transparency of the display panel, non-transparent or opaque components of the display panel (e.g., battery, printed circuit board, metal frame), can be disposed in the peripheral area rather than in the display regions.

Figure 5A:
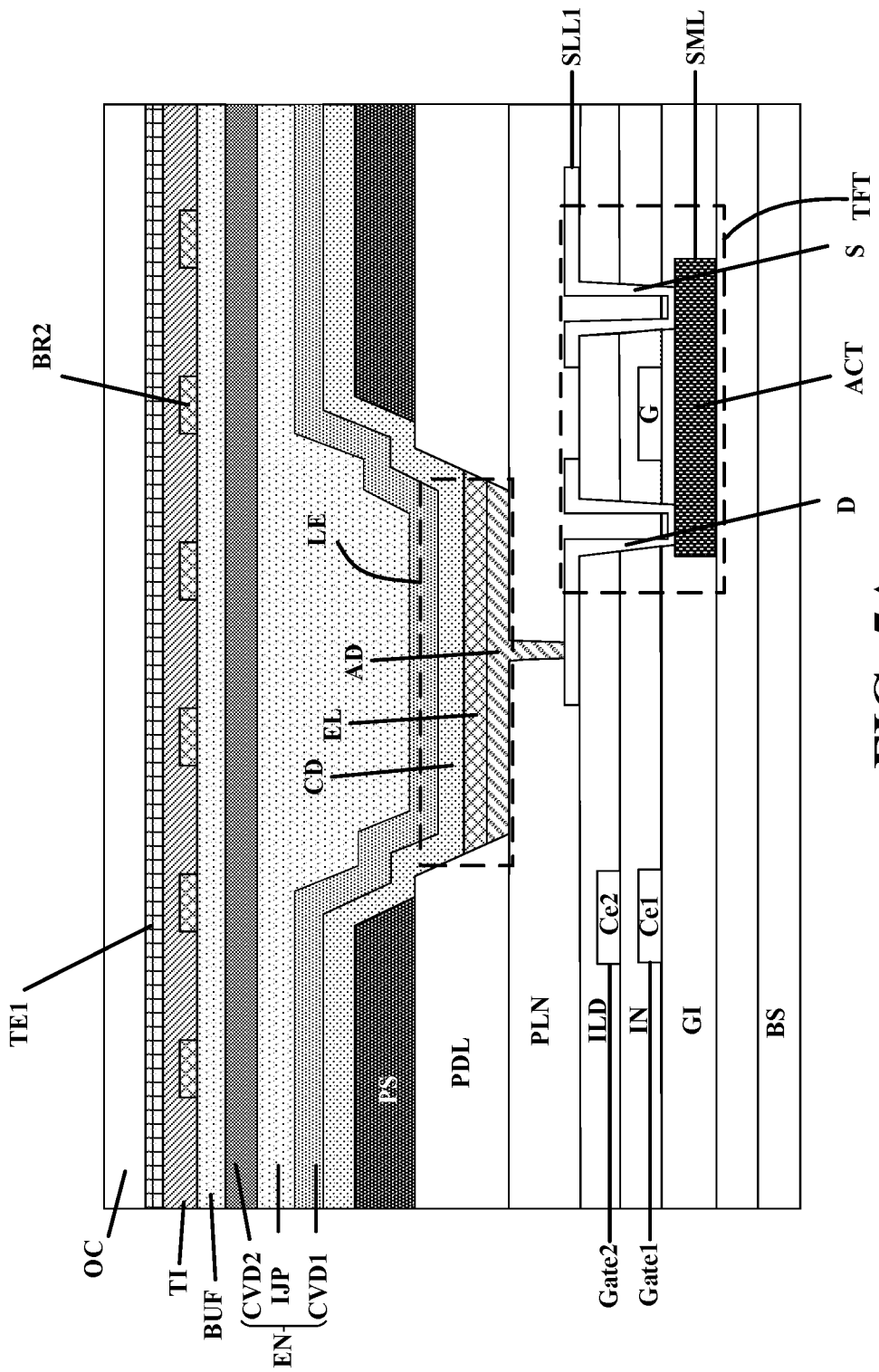
FIG. 5A illustrates a detailed structure in a display region in a display panel in some embodiments according to the present disclosure.

Various implementations of the present display panel may be practiced. FIG. 5A illustrates a detailed structure in a display region in a display panel in some embodiments according to the present disclosure. Referring to FIG. 5A, the display panel in the display region in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first conductive layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second conductive layer) on a side of the insulating layer IN away from the gate insulating layer GI; an inter-layer dielectric layer ILD on a side of the second capacitor electrode Ce2 away from the gate insulating layer GI; a first electrode S and a second electrode D (parts of a first SD metal layer) on a side of the inter-layer dielectric layer ILD away from the gate insulating layer GI; a planarization layer PLN on a side of the first electrode S and the second electrode D away from the inter-layer dielectric layer ILD; a pixel definition layer PDL defining a subpixel aperture and on a side of the planarization layer PLN away from the base substrate BS; and a light emitting element LE in the subpixel aperture. The light emitting element LE includes an anode AD on a side of the planarization layer PLN away from the inter-layer dielectric layer ILD; a light emitting layer EL on a side of the anode AD away from the planarization layer PLN; and a cathode layer CD on a side of the light emitting layer EL away from the anode AD. The display panel in the display region further includes an encapsulating layer EN encapsulating the light emitting element LE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display panel in the display region further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI.

Referring to FIG. 5A, the display panel includes a semiconductor material layer SML, a first conductive layer Gate1, a second conductive layer Gate2, and a first signal line layer SLL1. The display panel further includes an insulating layer IN between the first conductive layer Gate1 and the second conductive layer Gate2; and an inter-layer dielectric layer ILD between the second conductive layer Gate2 and the first signal line layer SLL1.

Figure 5B:
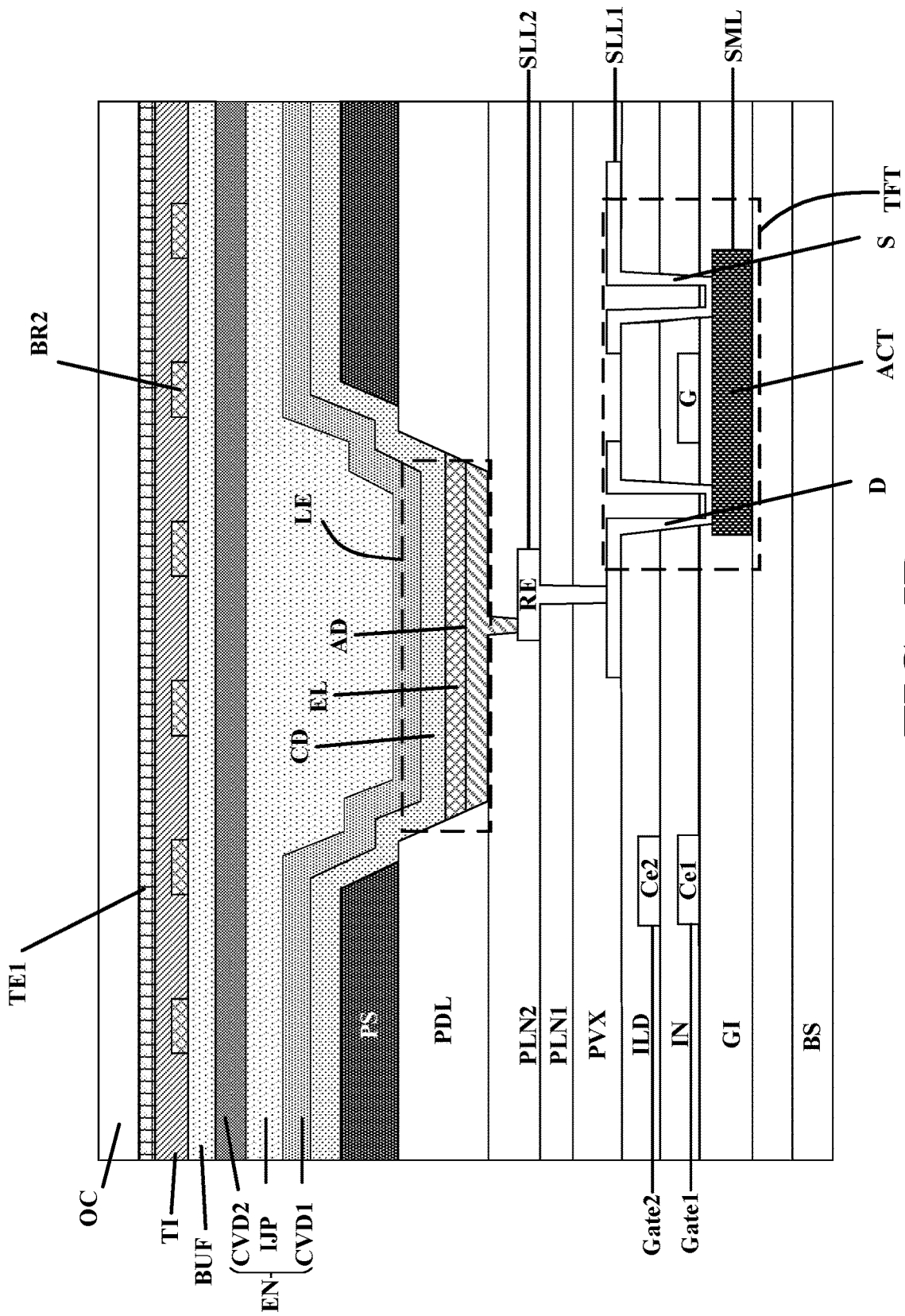
FIG. 5B illustrates a detailed structure in a display region in a display panel in some embodiments according to the present disclosure.

FIG. 5B illustrates a detailed structure in a display region in a display panel in some embodiments according to the present disclosure. Referring to FIG. 5B, the display panel in the display region in some embodiments includes a base substrate BS (e.g., a flexible base substrate); an active layer ACT of a respective one of a plurality of thin film transistors TFT on the base substrate BS; a gate insulating layer GI on a side of the active layer ACT away from the base substrate BS; a gate electrode G and a first capacitor electrode Ce1 (both are parts of a first conductive layer) on a side of the gate insulating layer GI away from the base substrate BS; an insulating layer IN on a side of the gate electrode G and the first capacitor electrode Ce1 away from the gate insulating layer GI; a second capacitor electrode Ce2 (a part of a second conductive layer) on a side of the insulating layer IN away from the gate insulating layer GI; an inter-layer dielectric layer ILD on a side of the second capacitor electrode Ce2 away from the gate insulating layer GI; a first electrode S and a second electrode D (parts of a first SD metal layer) on a side of the inter-layer dielectric layer ILD away from the gate insulating layer GI; a passivation layer PVX on a side of the first electrode S and the second electrode D away from the inter-layer dielectric layer ILD; a first planarization layer PLN1 on a side of the passivation layer PVX away from the inter-layer dielectric layer ILD; a relay electrode RE (part of a second SD metal layer) on a side of the first planarization layer PLN1 away from the passivation layer PVX; a second planarization layer PLN2 on side of the relay electrode RE away from the first planarization layer PLN1; a pixel definition layer PDL defining a subpixel aperture and on a side of the second planarization layer PLN2 away from the base substrate BS; and a light emitting element LE in the subpixel aperture. The light emitting element LE includes an anode AD on a side of the second planarization layer PLN2 away from the first planarization layer PLN1; a light emitting layer EL on a side of the anode AD away from the second planarization layer PLN2; and a cathode layer CD on a side of the light emitting layer EL away from the anode AD. The display panel in the display region further includes an encapsulating layer EN encapsulating the light emitting element LE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display panel in the display region further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI. Optionally, the display panel in the display region does not include the passivation layer PVX, e.g., the inter-layer dielectric layer ILD is in direct contact with the first planarization layer PLN1.

Referring to FIG. 5B, the display panel includes a semiconductor material layer SML, a first conductive layer Gate1, a second conductive layer Gate2, a first signal line layer SLL1, and a second signal line layer SLL2. The display panel further includes an insulating layer IN between the first conductive layer Gate1 and the second conductive layer Gate2; an inter-layer dielectric layer ILD between the second conductive layer Gate2 and the first signal line layer SLL1; and at least a passivation layer PVX or a planarization layer PLN between the first signal line layer SLL1 and the second signal line layer SLL2.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A scan circuit, comprising a plurality of stages;
   wherein a respective scan unit of the scan circuit in the respective stage of the plurality of stages comprises an input subcircuit, an output subcircuit, a first processing subcircuit, a second processing subcircuit, and a third processing subcircuit;
   wherein the respective scan unit comprises:
   a first capacitor in the second processing subcircuit;
   a third capacitor in the third processing subcircuit;
   an eighth transistor in the first processing subcircuit; and a ninth transistor and a tenth transistor in the output subcircuit;

wherein the respective scan unit comprises a first connecting line in a first signal line layer, a second connecting line in a first conductive layer;

the first connecting line is a first unitary structure electrically connecting a first electrode of a sixth transistor in the second processing subcircuit, a gate electrode of a seventh transistor in the second processing subcircuit, a gate electrode of a fourth transistor in the third processing subcircuit, and a second capacitor electrode of the third capacitor;

the second connecting line and a first capacitor electrode of the first capacitor are parts of a second unitary structure, the second connecting line electrically connecting the first capacitor electrode of the first capacitor to a second electrode of a third transistor in the third processing subcircuit; and the first connecting line crosses over the second connecting line.

2. The scan circuit of claim 1, wherein the respective scan unit further comprises a third connecting line in the first signal line layer, the third connecting line electrically connecting the second connecting line, the second electrode of the third transistor, and a second electrode of a second transistor in the third processing subcircuit.

3. The scan circuit of claim 2, wherein the respective scan unit further comprises a fourth connecting line in the first conductive layer, the fourth connecting line and a first capacitor electrode of the third capacitor are parts of a third unitary structure, the fourth connecting line electrically connecting the first capacitor electrode of the third capacitor, a second electrode of a first transistor in the input subcircuit, and a second electrode of the fourth transistor; and the third connecting line crosses over the fourth connecting line.

4. The scan circuit of claim 3, wherein the respective scan unit further comprises a branch line extending away from the fourth connecting line;

the branch line, the fourth connecting line, and the first capacitor electrode of the third capacitor are parts of the third unitary structure; and portions of the fourth connecting line and the branch line form a double-gate structure of a second transistor in the third processing subcircuit.

5. The scan circuit of claim 3, wherein the respective scan unit further comprises a fifth connecting line in the first signal line layer, the fifth connecting line electrically connecting the second electrode of the first transistor, the second electrode of the fourth transistor, and the fourth connecting line;

the fourth connecting line extends along a first direction; and the fifth connecting line extends along a second direction different from the first direction.

6. The scan circuit of claim 1, further comprising:
a second clock signal line in the first signal line layer; and
a sixth connecting line in the first conductive layer;
wherein the sixth connecting line electrically connects the first connecting line and the second clock signal line; and the sixth connecting line comprises the gate electrode of the fourth transistor.

7. The scan circuit of claim 1, further comprising:
a first clock signal line in the first signal line layer; and
a seventh connecting line in the first conductive layer;

wherein the seventh connecting line electrically connects a first electrode of a second transistor in the third processing subcircuit and the first clock signal line; and the seventh connecting line comprises a gate electrode of a first transistor in the input subcircuit and a gate electrode of the third transistor.

8. The scan circuit of claim 7, wherein the respective scan unit further comprises an eighth connecting line in the first signal line layer electrically connecting the seventh connecting line and the first electrode of the second transistor;

the seventh connecting line extends along a first direction; and the eighth connecting line extends along a second direction different from the first direction.

9. The scan circuit of claim 1, wherein the respective scan unit further comprises a ninth connecting line in the first signal line layer, the ninth connecting line electrically connecting a second capacitor electrode of the first capacitor to a second electrode of the sixth transistor and a first electrode of the seventh transistor; and an orthographic projection of the ninth connecting line on a base substrate partially overlaps with an orthographic projection of the second capacitor electrode of the first capacitor on the base substrate.

10. The scan circuit of claim 1, wherein an orthographic projection of the first connecting line on a base substrate partially overlaps with an orthographic projection of the second capacitor electrode of the third capacitor on the base substrate.

11. The scan circuit of claim 1, wherein the second connecting line, the first capacitor electrode of the first capacitor, a gate electrode of a fifth transistor in the third processing subcircuit, and a gate electrode of the sixth transistor are parts of the second unitary structure.

12. The scan circuit of claim 1, wherein the respective scan unit comprises:
a second capacitor in a first processing subcircuit; and
wherein the ninth transistor and the tenth transistor are arranged along a second direction;
the first capacitor, the third capacitor, the second capacitor are sequentially arranged along the first direction; and
along the first direction, the second capacitor is on a side of the ninth transistor and the tenth transistor away from the first capacitor and the third capacitor.

13. The scan circuit of claim 1, further comprising a first voltage signal line and a second voltage signal line in the first signal line layer;

wherein, along the first direction, the first voltage signal line and the second voltage signal line are on two opposite sides of transistors and capacitors of the respective scan unit;

the first voltage signal line is electrically coupled to a first electrode of a fifth transistor in the third processing subcircuit, a first electrode of an eighth transistor in the first processing subcircuit, and a first electrode of the ninth transistor in the output subcircuit; and the second voltage signal line is electrically coupled to a first electrode of the tenth transistor in the output subcircuit.

14. The scan circuit of claim 1, wherein a channel length of an active layer of the ninth transistor is equal to or less than 3.8 µm;

a channel length of the active layer of the tenth transistor is equal to or less than 3.8 µm;

a channel width of the active layer of the ninth transistor is greater than 180 µm; and a channel width of the active layer of the tenth transistor is greater than 180 μm.

15. The scan circuit of claim 1, wherein an active layer of the fourth transistor in the third processing subcircuit and an active layer of a fifth transistor in the third processing subcircuit are parts of a fourth unitary structure; and
- a ratio of a channel width of the active layer of the fourth transistor to a channel width of the active layer of the fifth transistor is in a range of 1.5:1 to 2.5:1.

16. The scan circuit of claim 1, wherein the respective scan unit further comprises a fifth connecting line in the first signal line layer, the fifth connecting line electrically connecting the second electrode of the first transistor, the second electrode of the fourth transistor, and the fourth connecting line; and
- an active layer of the first transistor, the fifth connecting line, an active layer of the fourth transistor in the third processing subcircuit, an active layer of a fifth transistor in the third processing subcircuit, are colinear and arranged sequentially along a second direction.

17. The scan circuit of claim 1, wherein an active layer of a first transistor and an active layer of the third transistor extend in parallel and along a second direction.

18. A display apparatus, comprising the scan circuit of claim 1, and a display panel.

19. The display apparatus of claim 18, further comprising a second scan circuit;
- wherein the scan circuit is configured to provide a control signal of a first type;
- the second scan circuit is configured to provide a control signal of a second type;
- the scan circuit and the second scan circuit are arranged along a first direction;
- the display apparatus further comprises, along the first direction, a first voltage signal line and a second voltage signal line configured to provide a first voltage signal and a second voltage signal to the scan circuit, and a third voltage signal line and a fourth voltage signal line configured to provide the first voltage signal and the second voltage signal to the second scan circuit;
- wherein the respective scan unit further comprises a tenth connecting line connecting a second capacitor electrode of a second capacitor in the respective scan unit to the third voltage signal line;
- the tenth connecting line crosses over multiple signal lines extending along a second direction and configured to provide signals to the second scan circuit; and
- the tenth connecting line and the second capacitor electrode of the second capacitor in the respective scan unit are parts of a fifth unitary structure.

* * * * *